Sept. 1, 1953     S. GOLDWASSER     2,650,872
METHOD AND APPARATUS UTILIZING COMPRESSIONAL WAVE
ENERGY IN THE UPPER SONIC AND SUPERSONIC
RANGE FOR WASHING TEXTILES
Filed Oct. 30, 1947

INVENTOR.
SEYMORE GOLDWASSER
BY
HIS ATTORNEYS.

Patented Sept. 1, 1953

2,650,872

UNITED STATES PATENT OFFICE 2,650,872

METHOD AND APPARATUS UTILIZING COMPRESSIONAL WAVE ENERGY IN THE UPPER SONIC AND SUPERSONIC RANGE FOR WASHING TEXTILES

Seymore Goldwasser, Chestnut Hill, Mass., assignor to Lever Brothers Company, Cambridge, Mass., a corporation of Maine Application October 30, 1947, Serial No. 783,050

7 Claims. (Cl. 8—159)

The present invention relates to washing methods and apparatuses and more particularly to new and improved methods and apparatuses in which compressional wave energy is propagated in cleaning liquids for washing soiled articles.

The copending application of John W. Bodman entitled "Supersonic Washing," filed August 2, 1947, Serial No. 765,761, now abandoned, discloses novel and highly effective methods and apparatuses for washing soiled articles by using compressional wave energy, preferably in the supersonic frequency range, in a cleaning liquid. As stated in that application, non-uniform cleaning action is sometimes obtained in washing with compressional wave energy when a relatively low power compressional wave energy source is employed. In particular, standing waves produced between the bottom of the washing vessel and the top of the cleaning liquid are believed to cause alternate soiled and unsoiled strips to be formed on the fabric being washed, the distance between strips being approximately equal to one-half the wave length of the compressional wave energy being used.

The principal object of the present invention is to provide new and improved methods and apparatuses for washing with compressional wave energy in which highly effective washing effects can be obtained with a relatively low power compressional wave energy source.

Another object of the invention is to provide new and improved washing methods and apparatuses of the above character in which the waves emitted by the source are, in effect, moved with respect to the articles being washed.

According to the invention, the above-noted incomplete washing effect sometimes observed when a relatively low power i. e., low intensity compressional wave energy source is used is effectively eliminated by causing standing waves set up in the liquid to be moved systematically relatively to the articles to be washed. The relative motion may be along the line of propagation of the wave energy or perpendicular thereto, and the articles may be disposed either parallel or normal to the line of propagation of the wave energy. The systematic relative motion may be produced, for example, by moving the source of compressional wave energy, preferably in an oscillatory fashion, with respect to the articles to be washed. In another form of the invention, a plurality of wave energy sources are employed, each displaced from the other by a fraction of a wave length. By energizing the several wave energy sources alternately, an effect is produced which is similar to that resulting when the source is moved. Movement of the compressional energy wave with respect to the articles to be washed can also be produced by using frequency modulated wave energy.

Additional objects and advantages of the invention will become apparent from the following detailed description of several typical forms of the invention, taken in conjunction with the accompanying drawings, in which.

Figure 3:
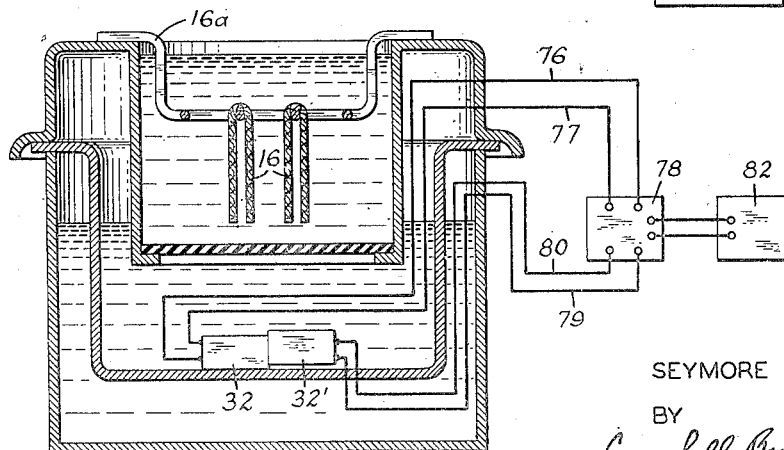
Figure 3 illustrates schematically another modification utilizing a plurality of wave generating means for providing compressional waves that are 90° out of phase.

The aforementioned application Serial No. 765,761 describes tests that were made in washing apparatus of the type shown in Figure 3 herein except that only a single crystal assembly 32 was used which was powered by a suitable oscillator. The oscillator was adjusted to operate at a frequency of approximately 143.7 kc. per second and the apparatus was designed to deliver approximately 300 watts of energy at this frequency over an area represented by a diameter of about 1⅞ inches of the crystal 32.

In one test, a sample of cotton sheeting approximately 7 inches long by 3 inches wide having an unsoiled reflectance of about 64% was soiled with vacuum cleaner soil until it presented a soiled reflectance of approximately 30%. The sample thus prepared was folded over in the form of a U to present two vertical parallel sides approximately 3 by 3½ inches with a section about half an inch wide in between. This was immersed in the washing liquid 15 to a depth of about 1¾ inches. The washing liquid 15 (Figure 3) comprised a 0.2% by weight mild soap solution in ordinary tap water having a hardness of about 60 p. p. m. at 120° F. The oscillator was turned on for approximately one second after which the specimen was removed, lightly rinsed and dried. It then presented the appearance shown generally in Figure 1. The upper dark area represents a soiled portion which was not immersed in the washing solution. After washing, the two areas 59 and 60, which were immersed in the cleaning liquid directly in the path of the wave energy emitted by the compressional wave energy source during the test, were of substantially uniform whiteness. On either side of the white areas 59 and 60 of the sample, a plurality of alternate soiled and unsoiled horizontal strips were found, the distance between strips being approximately equal to one-half the wave length of the waves emitted by the wave source.

It is believed that this unusual result is caused by the fact that a standing wave is produced between the bottom of the washing vessel and the surface of the cleaning solution. Intense washing action takes place at the nodes of the standing wave, producing white clean areas from which the soil is removed. A much lesser washing action takes place at the antinodes of the standing wave so that the cleaning effect there is less.

Horizontal striations are not produced in the areas 59 and 60 above the wave source, since the action of the latter causes the cleaning liquid surface to bounce up and down preventing the formation of standing waves and producing traveling waves which result in intense cleaning action all over the areas 59 and 60.

As indicated in the above-mentioned copending application, the striations can be eliminated by increasing the intensity of the wave energy. Alternatively, they can be eliminated, according to the present invention, by producing systematic relative motion between zones of high intensity wave energy and the articles to be washed.

Figure 2:
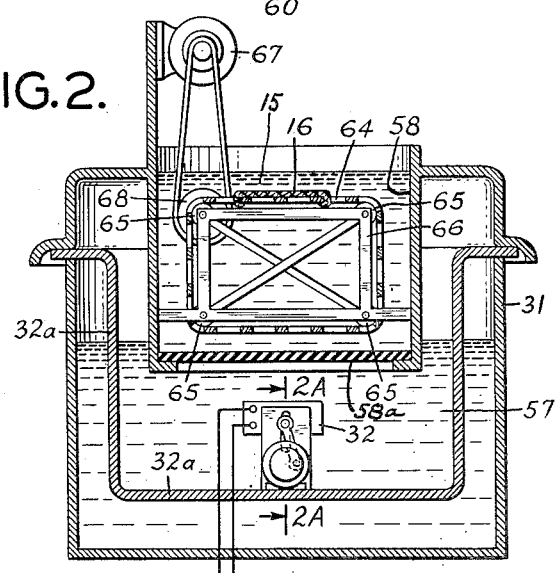
Figure 2 is a schematic diagram of apparatus constructed according to the invention for washing soiled articles.

In Fig. 2, the washing apparatus comprises a container 58 having a bottom 58a made of a material which has a good acoustic coupling coefficient and which is thin enough to avoid heating of the plastic material by dissipaton of compressional wave energy. For example, the bottom 58a may be made of methyl methacrylate plastic about 40 mils thick. The lower end of the container 58 is preferably immersed in an insulating oil 57 such as a mineral oil, for example, in a container 31. Compressional wave generating means 32 is supported in any suitable manner, as on the bracket 32a, for example, in the oil 57 beneath the bottom 58a of the container 58. The articles 16 to be washed and a cleaning liquid 15, which may be a soap solution, for example, are disposed in the container 58.

The wave generating means 32 may be of any suitable type such as the piezo-electric crystal assembly disclosed in the above-mentioned copending application and it may be energized by any suitable driving means 40. Preferably, the wave generating means 32 should be designed to produce compressional wave energy in the supersonic frequency range.

Figure 2A:
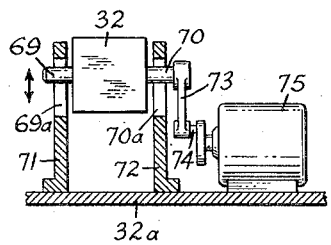
Figure 2A is a detail view, partially in section, taken along line 2A—2A of Fig. 2, looking in the direction of the arrows.

In Figures 2 and 2A, for example, the alteration of the wave may be accomplished by producing relative movement between the articles 16 being washed and the wave generating means 32 by moving the latter. To this end, the wave generating means 32 may be provided with laterally extending pins 69 and 70 (Fig. 2A) slidable vertically in slots 69a and 70a formed in parallel supports 71 and 72 secured on the bracket 32a. The pins 69 and 70 preferably have parallel flat sides so as to prevent rocking of the wave generating means 32 in its support. The pin 70 is pivotally secured to a connecting rod 73 which is pivotally connected to a crank arm 74 on the shaft of a conventional enclosed electrical motor 75 secured within the apparatus, as shown.

With this construction, as the crank arm 74 of the motor rotates, the wave generating means 32 will be reciprocated upwardly and downwardly with respect to the articles 16 that are being washed and substantially parallel to the surface of the liquid 15. If the total amplitude of the oscillatory movement is made equal to at least one-half the wave length of the wave being emitted by the wave generating means 32, it will be apparent that the striations will not be formed but that complete cleaning will be effected.

The wave generator 32 has a vibrating surface which forms a vibrating zone, which sets up a series of standing waves of successively different phase, the nodes and antinodes of which in effect travel along the line of propagation of the wave, whereby the zones of lesser cleaning effect of one wave occur close to the zones of better cleaning effect of the next wave, thereby producing a substantially uniform cleaning.

If desired, a similar result can be produced by supporting the articles 16 to be washed on an endless belt 64 mounted on rollers 65 secured on a frame 66, as shown in Fig. 2. The articles to be washed may be carried parallel to the surface of the belt or may hang vertically therefrom, as desired. The belt 64 is adapted to be driven by a motor 67, belt connected to a driving pulley 68 mounted on one of the rollers 65. It will be noted that, when the belt is in its lowermost position, the articles 16 carried thereby are moved substantially perpendicular to the direction of propagation of the wave energy emitted by the wave generating means 32. Hence, all areas of the articles 16 are subjected to the washing action and the striations shown in Figure 1 are not formed.

Formation of the striations can also be prevented without moving the articles 16 by using frequency modulated waves with a large enough frequency excursion to insure complete cleaning.

In Figure 3 is shown still another modification in which the striations may be eliminated by employing two wave generating means 32 and 32' which are vertically spaced apart so that the compressional waves generated by each are 90° out of phase. The wave generating means 32 and 32' are connected through the conductors 76, 77 and 79, 80, respectively, to conventional switching means 78 which serves to connect the wave generating means 32 and 32' alternately in continuous succession to an oscillator 82.

Figure 1:
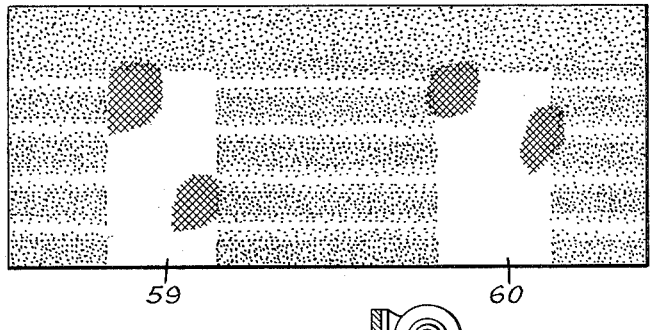
Figure 1 is a representation of a soiled cotton cloth sample after washing in supersonic washing apparatus having a relatively low power wave energy source.

In operation with the apparatus shown in Figure 3, when the oscillator 82 is connected to the wave generating means 32, the latter will emit waves of given frequency and phase which may form clean and unclean striations on articles 16 being washed, as shown in Figure 1. When the oscillator 82 is switched from the wave generating means 32 to the wave generating means 32' by the switching means 78, the wave generating means 32 ceases operation and the wave generating means 32' emits waves of the same frequency but 90° out of phase with the waves formerly emitted by the wave generating means 32. These waves will have maximum cleaning effect at the unclean striations of the articles 16 being washed so that complete cleaning of the articles will be effected.

With the described construction, first and second standing waves 90° out of phase are produced; the nodes and antinodes of these standing waves are substantially one-half wave length apart, whereby the zones of lesser cleaning effect of one wave occur close to the zones of better cleaning effect of the next wave, 90° out of phase therewith, thereby producing a substantially uniform cleaning.

From the foregoing description, it will be apparent that the invention provides novel methods and apparatuses for washing soiled articles in which highly effective results can be obtained with a relatively low power wave generating means. Further, the remarkable washing effects characteristic of the invention can be obtained without damaging the articles being washed and in an extremely short period of time.

Examples of detergents and soaps suitable for use in washing articles according to the invention are given in the above-mentioned copending application of John W. Bodman.

As also disclosed in the said Bodman application Serial No. 765,761, although good results can be obtained with compressional wave energy having a frequency in the upper part of the audible frequency band, preferably supersonic frequency should be used. In general, supersonic frequencies are those above the audible band namely, above 15,000 to 20,000 cycles per second.

The several representative embodiments described in detail above are intended merely to be illustrative and not restrictive of the invention. Obviously, they are susceptible of numerous changes in form and detail within the scope of the appended claims.

I claim:

1. In a method of cleaning soiled textile articles, the steps of immersing a soiled textile article in a cleaning liquid with substantially all portions of the textile article lying along and in line with a straight path therein, providing a vibrating zone for producing compressional wave energy of low intensity and of a frequency lying in the upper audible and supersonic range, propagating compressional wave energy from said zone in line with and parallel to said path in the liquid and along the soiled article, producing standing waves with said high frequency wave energy for producing along the soiled article, standing wave nodes and antinodes of compressional wave energy, said nodes and antinodes having effective soil removal action on the article in zones spaced substantially one-half wave length apart and displacing said vibrating zone to-and-fro along the line of propagation of the wave energy for displacing the positions of the standing wave nodes and antinodes.

2. In a method of cleaning soiled textile articles, the steps of immersing a soiled textile article in a cleaning liquid with substantially all portions of the textile article, lying along and in line with a straight path therein, propagating, in line with and parallel to said path in the liquid and along the soiled article, standing compressional wave energy of low intensity and of a frequency lying in the upper audible and supersonic range for producing, along the soiled article, standing wave nodes and antinodes of compressional wave energy, said nodes and antinodes having effective soil removal action on the article in zones spaced substantially one-half wave length apart, and modulating the frequency of the wave energy for displacing the positions of the standing wave nodes and antinodes relative to the article.

3. In a method of cleaning soiled textile articles, the steps of immersing a soiled textile article with all portions of the article lying in a straight path, propagating low intensity, compressional wave energy of a frequency in the upper audible and supersonic range in line with and parallel to the path therein, establishing alternately in the liquid and along the article first and second standing waves, said first and second standing waves being of substantially the same wave length but about 90° out-of-phase, the nodes and antinodes of each of said standing waves having effective soil removal action on the article in zones substantially one-half wave length apart, whereby substantially uniform cleaning of the article may be effected.

4. In apparatus for cleaning soiled textile articles, the combination of a container for soiled articles and a cleaning liquid, high frequency vibrating means capable of generating compressional wave energy of low intensity and of a frequency lying in a range including the upper audible and supersonic frequencies, acoustic coupling means interposed between said vibrating means and the liquid for propagating compressional wave energy from said vibrating means through the liquid and normally to a plane boundary thereof, thereby producing, in the liquid, standing wave nodes and antinodes of compressional wave energy, means for supporting textile articles in the liquid with substantially all portions thereof lying in the path of, and parallel to the direction of propagation of said compressional wave energy, whereby said article portions will be subjected to greater and lesser washing effects in zones spaced substantially one-half wave length apart in the direction of propagation of said wave energy, control means acting upon said vibrating means for determining the positions of said standing wave nodes and antinodes relatively to said article portions along a line parallel to the direction of propagation of said wave energy, and actuator means for operating said control means periodically to produce a corresponding back and forth relative movement between the nodes and antinodes of said standing wave and said article supporting means along the line of propagation of the wave energy generating said standing wave so as to effect substantially uniform cleaning of said articles.

5. Apparatus as defined in claim 4 in which the vibrating means comprises at least one compressional wave generator, and the control means comprises means for imparting back and forth motion to the wave generator along the line of propagation of the wave energy generating said standing wave.

6. Apparatus as defined in claim 4 in which the vibrating means comprises at least one compressional wave generator and the control means comprises modulator means for modulating the frequency of the compressional wave energy generated by the generator.

7. Apparatus as defined in claim 4 in which the vibrating means comprises at least two compressional wave generators spaced substantially one-quarter wave length apart along the line of propagation of said wave energy and the control means comprises switching means for connecting said respective generators selectively to a high frequency source of electrical energy.

SEYMORE GOLDWASSER.

References Cited in the file of this patent

UNITED STATES PATENTS

| Number | Name | Date |
|--------|------|------|
| 498,371 | Wadsworth | May 30, 1893 |
| 2,468,550 | Fruth | Apr. 26, 1949 |

FOREIGN PATENTS

| Number | Country | Date |
|--------|---------|------|
| 806,030 | France | Dec. 5, 1936 |
| 691,392 | France | July 8, 1930 |
| 548,960 | Great Britain | Oct. 20, 1942 |
| 587,214 | Great Britain | Apr. 17, 1947 |

OTHER REFERENCES

"Textile Colorist," page 35, January 1943.